United States Patent
Adams et al.

(10) Patent No.: US 7,461,541 B2
(45) Date of Patent: Dec. 9, 2008

(54) LEAK DETECTION METHOD FOR A PRIMARY CONTAINMENT SYSTEM

(75) Inventors: Joby L. Adams, Fort Collins, CO (US); Eric L. Hick, Fort Collins, CO (US)

(73) Assignee: C.G.R.S., Inc, Fort Collins, CO (US)

( * ) Notice: Subject to any disclaimer, the term of this patent is extended or adjusted under 35 U.S.C. 154(b) by 148 days.

(21) Appl. No.: 11/535,910

(22) Filed: Sep. 27, 2006

(65) Prior Publication Data

US 2008/0072659 A1    Mar. 27, 2008

(51) Int. Cl.
*G01M 3/02* (2006.01)
*G01M 3/26* (2006.01)
*G01M 3/32* (2006.01)

(52) U.S. Cl. .................... 73/40.5 R; 73/46; 73/49.2; 73/49.3; 73/49.8

(58) Field of Classification Search ............ 73/40–49.8, 73/38
See application file for complete search history.

(56) References Cited

U.S. PATENT DOCUMENTS

| | | | | | |
|---|---|---|---|---|---|
| 4,404,843 | A | * | 9/1983 | Johnson et al. ............... | 73/49.2 |
| 4,450,711 | A | * | 5/1984 | Claude .................... | 73/40.5 R |
| 4,796,676 | A | * | 1/1989 | Hendershot et al. ........... | 141/83 |
| 4,939,833 | A | * | 7/1990 | Thomas ...................... | 220/565 |
| 5,265,465 | A | * | 11/1993 | Thomas ...................... | 73/49.2 |
| 5,265,652 | A | * | 11/1993 | Brunella ...................... | 141/59 |
| 5,343,191 | A | * | 8/1994 | McAtamney ............... | 340/605 |
| 5,375,457 | A | * | 12/1994 | Trapp .......................... | 73/40.7 |
| 5,589,631 | A | * | 12/1996 | Spring et al. ................. | 73/49.2 |
| 5,668,534 | A | * | 9/1997 | Haboian et al. ............. | 340/605 |
| 6,029,505 | A | * | 2/2000 | Webb ....................... | 73/40.5 R |
| 6,067,844 | A | | 5/2000 | Westbrook et al. | |
| 6,116,817 | A | * | 9/2000 | Osborne ................... | 405/154.1 |
| 6,935,161 | B2 | * | 8/2005 | Hutchinson .............. | 73/40.5 R |
| 7,197,950 | B2 | * | 4/2007 | Maxwell et al. ............ | 73/865.6 |
| 7,251,983 | B2 | * | 8/2007 | Hutchinson .............. | 73/40.5 R |
| 2003/0037596 | A1 | * | 2/2003 | Sorensen ..................... | 73/40.7 |
| 2004/0045343 | A1 | * | 3/2004 | Hutchinson .............. | 73/40.5 R |
| 2004/0234338 | A1 | * | 11/2004 | Monroe et al. ................. | 405/54 |
| 2005/0166666 | A1 | * | 8/2005 | Tsukagoshi ................. | 73/49.1 |
| 2006/0107731 | A1 | * | 5/2006 | Thomas ...................... | 73/49.2 |
| 2007/0101803 | A1 | * | 5/2007 | Tujii et al. ..................... | 73/38 |
| 2007/0119238 | A1 | * | 5/2007 | Issel ........................... | 73/40.7 |
| 2008/0011056 | A1 | * | 1/2008 | Spaolonzi et al. ............. | 73/40 |
| 2008/0011057 | A1 | * | 1/2008 | Spaolonzi et al. ............. | 73/40 |

FOREIGN PATENT DOCUMENTS

EP            753729 A2 *    1/1997

OTHER PUBLICATIONS

"Helium Pre-Testing for New Construction", The CGRS Compliance Advisory vol. 1, Isssue 19, C.G.R.S., Apr. 2005.*

* cited by examiner

*Primary Examiner*—David A. Rogers
(74) *Attorney, Agent, or Firm*—Edwin H. Crabtree; Ramon L. Pizarro

(57) ABSTRACT

In one aspect the method provides for determining changes in helium concentration over time in the interstitial space between a primary vessel that is charged with helium and a secondary vessel. The expected concentration resulting from permeation is calculated and accounted for. In another aspect, air is circulated in the interstitial space. An abrupt change in measured concentrations may be used to determine an approximate leak location.

7 Claims, 5 Drawing Sheets

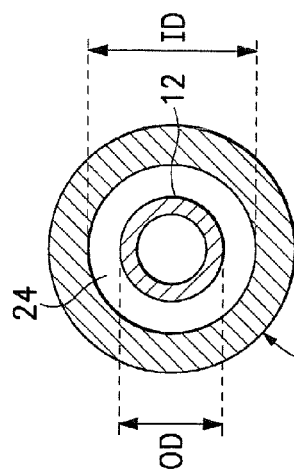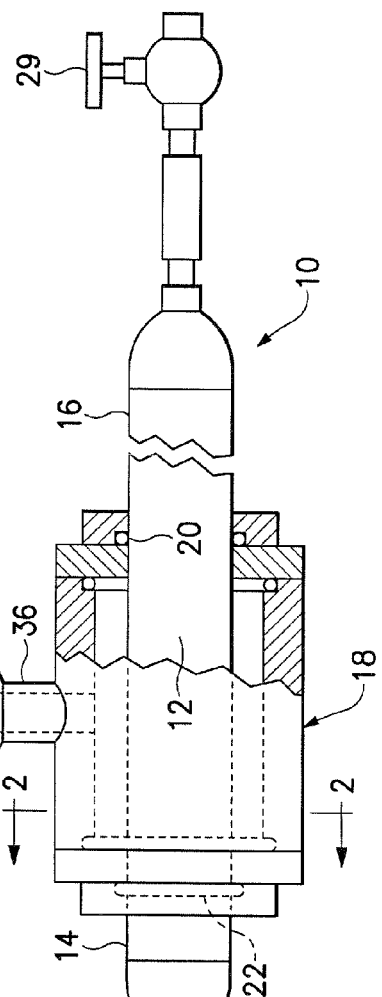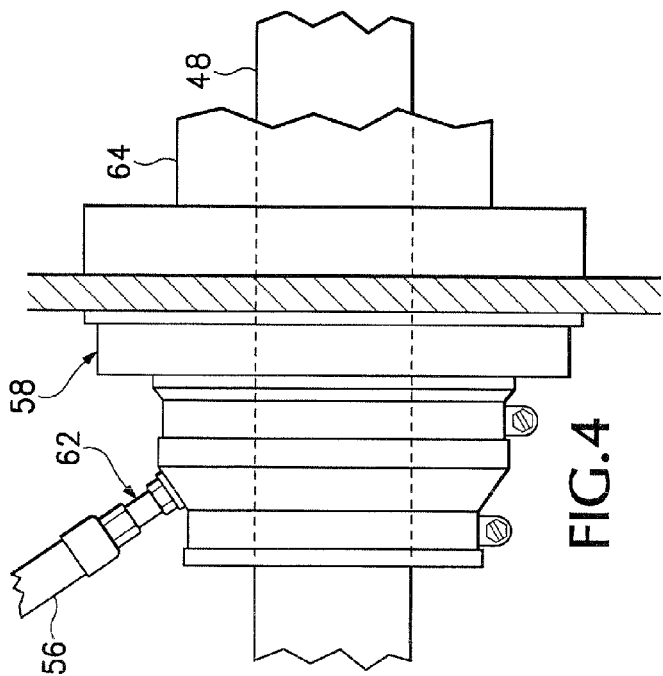

LEAK DETECTION METHOD FOR A PRIMARY CONTAINMENT SYSTEM

FIELD OF THE INVENTION

The present invention relates to detecting leaks in a containment system of the type that has a primary container, such as a tank or a pipe, contained within a secondary container.

BACKGROUND

Systems for storing or transporting fluids that may damage the environment, such as caustic or volatile fluids, are often double-wall systems. These systems include a primary container that contains the fluid and a secondary container that contains the primary container. As a result, if the primary container leaks, the fluid is contained within the secondary container.

After such systems are installed, they are typically tested, which may be required by governmental regulations, to make sure that the primary container is functioning properly, i.e., not leaking. Sometimes these systems are buried underground. For example, petroleum dispensers are typically connected to underground storage tanks that contain the petroleum. The underground tanks as well as the pipe connecting the tanks to the dispensers are almost always primary containers that are surrounded and sealed within secondary containers. Even though the primary container is intended for liquids, the integrity of the system is typically determined by testing for vapor leaks.

Testing these, and other underground systems, after installation poses challenges because most of the containment system is buried and therefore not accessible except for portions that communicate with the surface, such as manways, risers and the like. Another challenge, regardless of the system location, is that the primary container may be made of a polymeric material that is somewhat permeable to any vapors it contains. In other words, there is a continuous, albeit small, transmission of vapor within the primary container into the interstitial space between the primary and secondary containers. This may need to be taken into account to accurately determine whether there is a vapor leak over and above that expected as a result of permeation.

Furthermore, when a primary system is first pressurized for testing, typically with a tracer gas, very little fluid permeates into the interstice between the primary and secondary containers. But permeation increases over time. When a primary vessel under test has been pressurized for a period before the test begins, concentrations of interstitial tracer gas are higher at the start of the test than if the vessel was pressurized immediately prior to the test start. These higher concentrations that result from permeation should be considered when determining the integrity of the primary vessel. Aside from the permeation issues, when a primary vessel is a pipe, especially a buried one, it would be desirable to approximate the location of any leak detected so that only a relatively small portion of the pipe system needed to be exposed by digging and then repaired.

BRIEF DESCRIPTION OF THE DRAWINGS

FIG. 1 is a somewhat schematic view of a test setup for determining helium permeation of a polymeric pipe.

FIG. 2 is an enlarged cross-sectional view taken along lines 2-2 in FIG. 1.

FIG. 4 is a partial enlarged view of a portion of the structure shown in FIG. 3.

DETAILED DESCRIPTION

Figure 3:
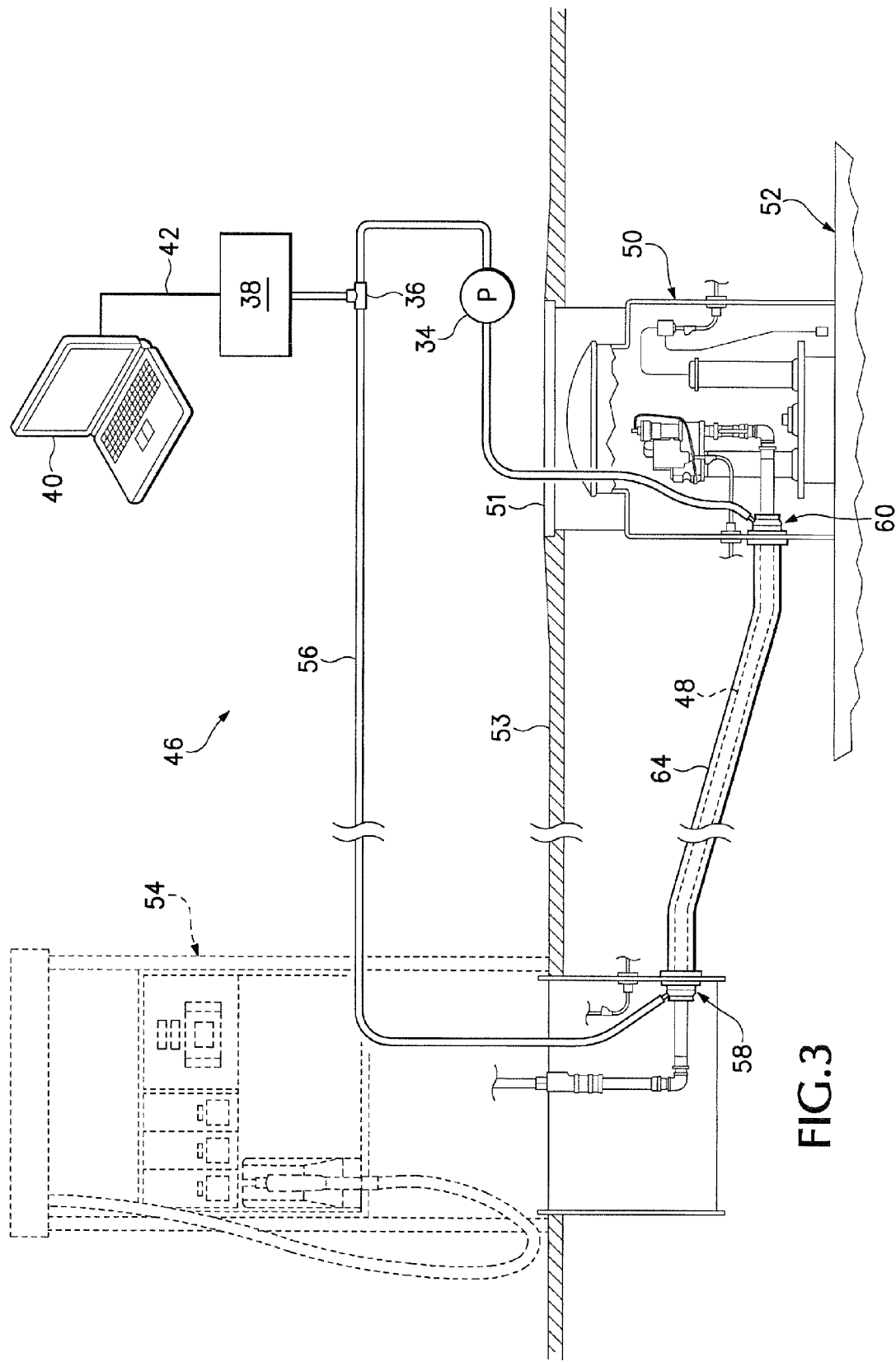
FIG. 3 is a somewhat schematic view of a test setup for determining the integrity of a buried pipe that runs between an underground storage tank and a petroleum dispenser.

Turning now to FIG. 1, indicated generally at 10 is a test setup for determining helium permeation of a polymeric material in the form of a pipe 12, having ends 14, 16. Because polymeric materials can be made from a variety of compositions, by different manufacturers, and with different wall thicknesses, it is desirable to use the exact material in pipe 12 that is to be tested in the field. A portion of pipe 12 is contained within a vacuum chamber 18. O-rings 20, 22 seal between the outer diameter of pipe 12 and the inner diameter of vacuum chamber 18. This creates an annular space 24 (also visible in FIG. 2) between the outer diameter of pipe 12 and the inner diameter of vacuum chamber 18.

End 14 of pipe 12 is connected to a helium tank 26 via a hose 28 and one or more valves, regulators, and gauges, as shown, for delivering helium from tank 26 to the interior of pipe 12. A valve 29 seals the interior of pipe 12 from the surrounding atmosphere when closed and provides open communication when opened. A T-joint 36 extends from vacuum chamber 18 and provides communication annular space 24 and a helium leak detector 38. The present implementation uses a Model 979 Series Helium Mass Spectrometer Leak Detector manufactured by Varian, although other types of helium sensors may be equally well used. Helium sensor 38 generates electrical signals that are proportional to helium concentration. These signals are provided to a computer 40, a laptop computer in the present embodiment, via a cable 42. In addition, helium sensor 38 includes a vacuum pump that, when operating, can create a powerful vacuum within annular space 24.

Before considering containment systems in the field, and how they are tested, a description of how setup 10 is used to determine permeation of polymeric material that is used in such containment systems is provided. After the polymeric material of interest, in the form of pipe 12, is configured as shown in setup 10, helium leak detector 38 is turned on to warm up. When the helium detector is ready, valve 29 is opened and helium tank 26 is placed in communication with hose 28 thus flushing out the interior of pipe 12. Valve 29 is then shut thereby pressurizing the interior of pipe 12 with helium at a positive pressure. Next the helium leak detector is activated to begin sensing the rate of change of helium in volume per unit time.

A program in computer 40 receives this data from helium sensor 38, which is in the form of periodic measurements indicating current concentrations of helium. These samples are shown on the permeation curve of FIG. 6 as diamonds. The samples are used in the best-fit curve equation at the top of FIG. 6 to create a curve 44 that substantially intersects each of the samples. When pipe 12 is first pressurized with helium there is no leaking. This is because permeation increases with time, as can be seen in the early stages of the curve. As can also be seen, the trace gas tends to saturate after the pipe has been pressurized for a while. In other words, there is only a gradual increase of helium flow through the polymeric material that results from permeation.

Typically a variety of pipes, like pipe 12, from different manufacturers and having different thicknesses are tested as described above. The test results produce different curves, like the curve of FIG. 6, for each pipe. Each curve is standardized for that material by correlating it with the surface area of the pipe 12, which produces a standard permeation curve for the material and thickness of pipe 12. These standardized permeation curves are stored on computer 40. When a particular polymeric material is encountered in a containment system to be tested, the corresponding standard permeation curve is used, in a manner that will be described, to test the system.

Turning now to FIG. 3, indicated generally at 46 is a test setup for determining the integrity of a buried containment system, specifically a pipe 48. As can be seen in FIG. 3, pipe 48 connects a manway 50, which is located on the top of a buried petroleum storage tank 52, with a petroleum dispenser 54. Manway 50 includes an access plate 51 that is substantially flush with the surface 53 of the ground in which tank 52 and pipe 48 are buried. Structure in setup 46 that is the same as structure in setup 10, in FIG. 1, retains the same numeral identifier in FIG. 3.

In setup 46, a hose 56 connects to fittings 58, 60 on either end of hose 48. Fitting 58 is conventional except for a quick-release connection 62, on fitting 58, which permits hose 56 to be connected to and disconnected from the fittings. FIG. 4 depicts an enlarged view of this arrangement. Pipe 48 is like pipe 12 in FIG. 1 in that it is made by the same manufacturer from the same material and has the same thickness. Pipe 48 is contained within a secondary pipe 64. Like the test setup of FIG. 1, which has annular space 24 (FIG. 2), there is an annular space between the outer diameter of pipe 48 and the inner diameter of pipe 64. Fittings 58, 60 permit fluid communication between the annular space and hose 56 on either end of the hose. As a result, as in test setup 10, when pump 34 is on, air circulates through hose 56 and along the length of the annular space.

Figure 5:
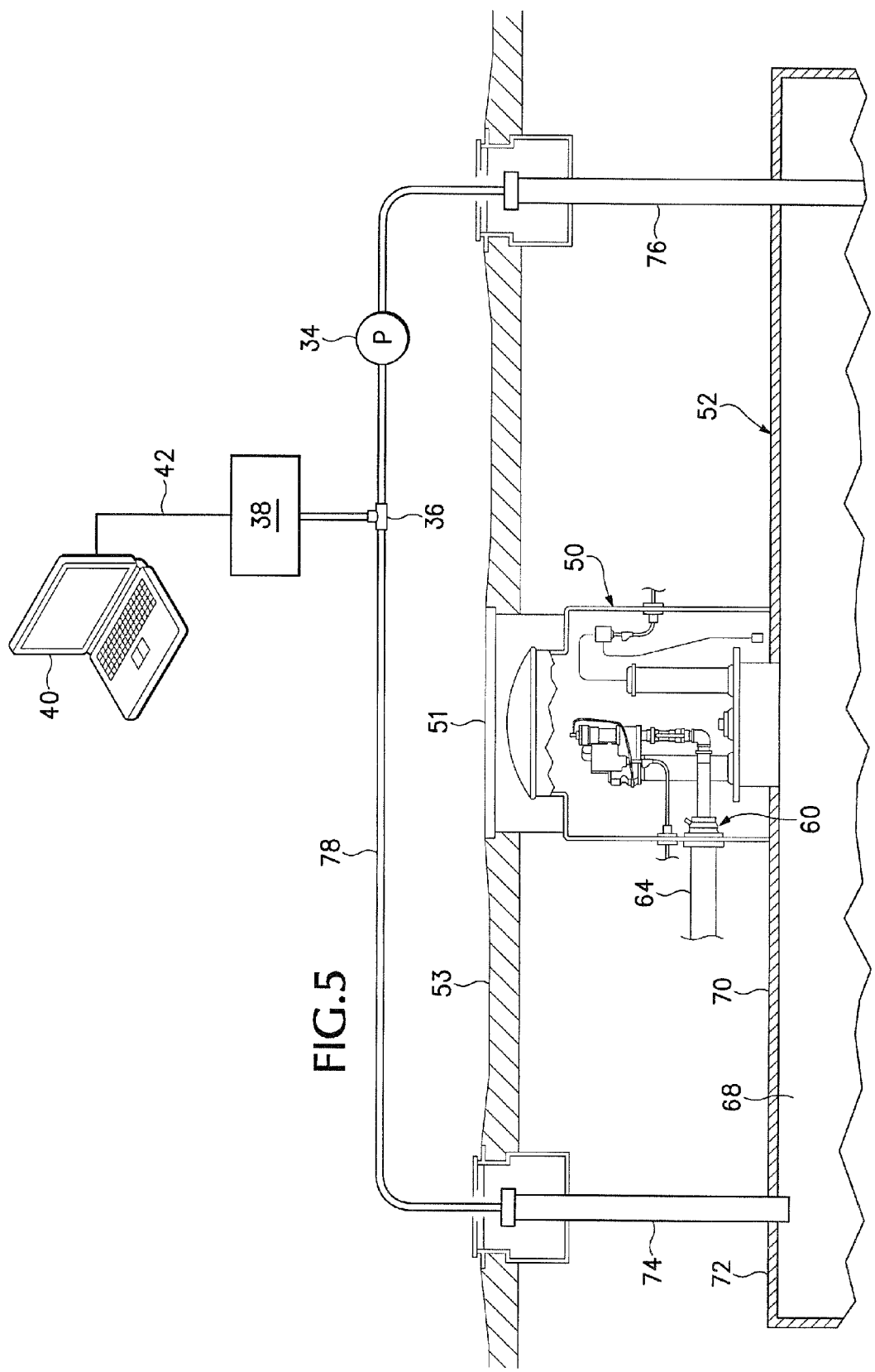
FIG. 5 is a somewhat schematic view of a test setup for determining the integrity of the underground storage tank in FIG. 2.

Before considering testing of the system of FIG. 3, description will first be made of another system test, namely testing the integrity of the underground tank 52 of FIG. 3, which is also shown in FIG. 5. Structure already described that is the same as structure in the setup of FIG. 5 retains the same numeral identifier. Tank 52 includes a primary vessel 68, which is made from a known polymeric material, and a secondary vessel 70. An interstitial space 72 is formed between the two vessels. A first riser 74 communicates with an upper portion of space 72, and a second riser 76 communicates with a portion of space 72, not visible, on the lower side of tank 52. A hose 78 connects risers 74, 76 via pump 34 and T-joint 36.

Considering first testing of the system of FIG. 5, primary vessel 68 is charged with helium from a tank (not shown) that is connected to the primary vessel 68 via connections in manway 50. After the tank is fully charged helium detector 38 is turned on. After it warms tip, fan 34 starts, with one end of hose 78 disconnected from its associated riser. This flushes whatever gasses may be in space 72 out into the atmosphere and essentially places the ambient atmospheric gasses into space 72. The hose is then reconnected and detector 38 begins making periodic measurements of helium concentration in hose 78 at its juncture with T-joint 38. It should be appreciated that the time between fully charging the vessel 68 and beginning of the test procedure, i.e., the start of concentration measurements, might be as little as a few minutes or it might be many weeks. The longer charging period may result from using helium for a preliminary pressure test that is conducted well before a final test, which is typically a government-sanctioned test. This procedure conserves helium and prevents additional helium transport if the initial charge is left in the vessel for the final test. But when the vessel has been charged for a long period before the final test, permeation of helium into space 72 could be a significant portion of the helium concentrations measured.

This is true even though any helium in space 72 is flushed out as just described. It will be recalled that permeation increases over time, If the tank has been charged with helium for long enough, permeation of helium into space 72 will migrate into space 72 at the beginning of the test and will contribute to any helium measured, which may include helium contributed by one or more leaks or other defects in primary vessel 68 through which helium moves into space 72.

In the present embodiment, if there is a leak rate greater than 0.005 gallon per hour, the system fails and cannot be returned to or put into service. Although 0.005 gallon per hour is used as a test standard in this description, it should be appreciated that different jurisdictions use different standards. Other standards, which could also be tested for, might be imposed by a manufacturer or by the purchaser of the containment system. Knowing the volume of space 72, risers 74, 76 and hose 78, which together make up the volume of gas circulated by fan 34 and tested by detector 38, makes it possible to calculate the concentration of helium that equals the 0.005 gallon per hour leak rate. This value is calculated and stored on computer 40.

Figure 6:
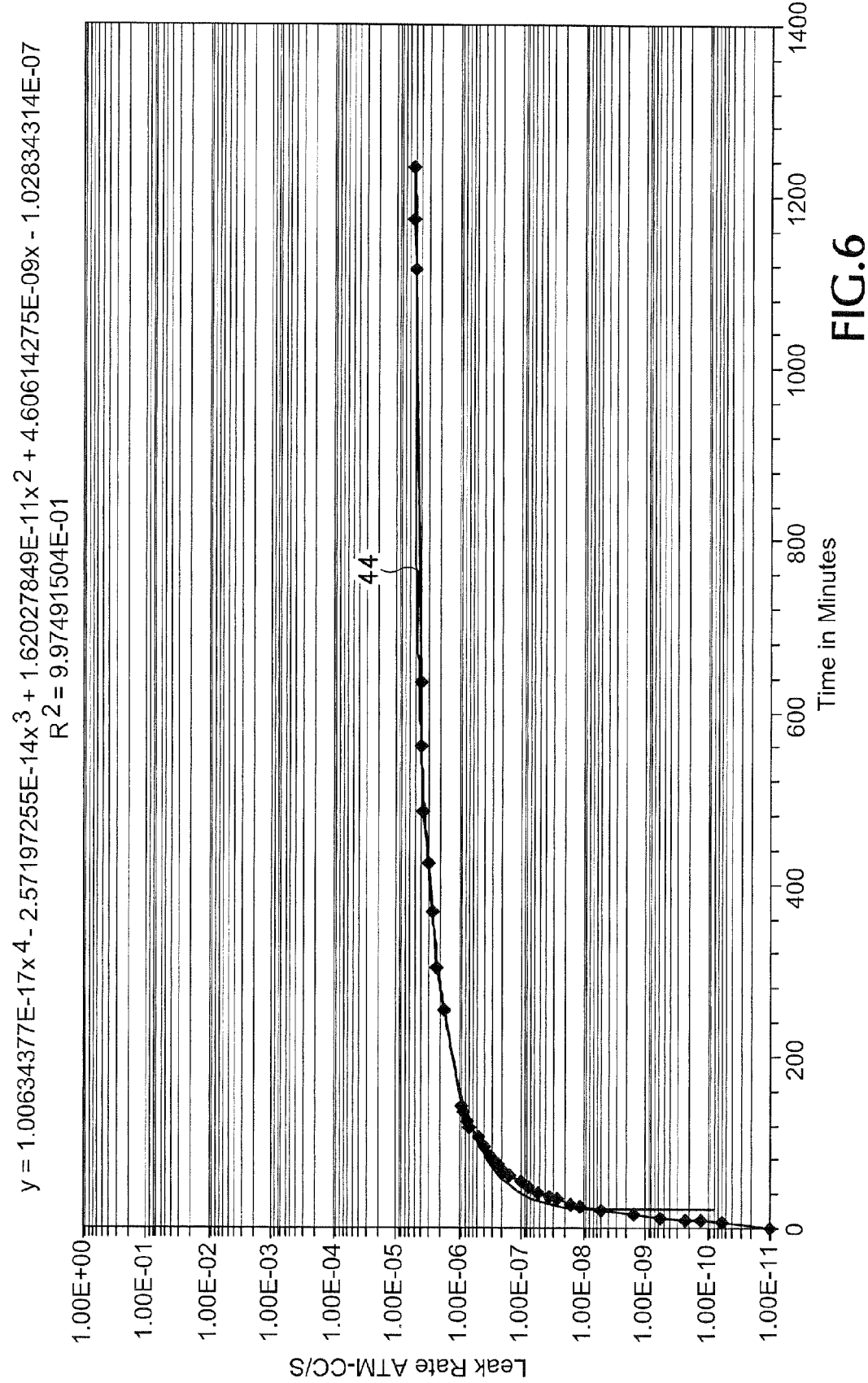
FIG. 6 is a permeation curve that resulted from the test depicted in FIG. 1.

If the tank has been charged long enough for the permeation through primary vessel 68 to be substantially steady state, i.e., after about 200-400 minutes in the curve of FIG. 6, consecutive samples taken by detector 38 can be considered. If the samples are both below the calculated 0.005 gallon per hour benchmark, the system passes.

But if pair of measurements indicates a leak rate higher than the benchmark, that does not necessarily mean the system failed. It is possible that, due to permeation, concentrations early in the test period might exceed the 0.005 gallon per hour limit. As a result, the present method measures changes in concentrations over time, and compares these changes to changes in concentration over time that would be expected as a result of permeation.

By way of example, assume that the system test in FIG. 5 was initiated, i.e., measurement of helium concentrations began, 200 minutes after the tank was charged with helium, and end 400 minutes after charging. As can be seen on the FIG. 6 curve, permeation is fairly advanced at 200 minutes. The total expected flow for the 200 minute test period can be determined by integrating the standard curve between 200 and 400 minutes and scaling this value to FIG. 5 system using the exterior surface area of vessel 72, through which the permeation occurs, and the total volume where the helium concentration measurements are taken, namely the volume of space 72 plus the volumes of risers 74, 76 and hose 78.

The measured helium concentration, which includes permeation plus helium flow resulting from any leaks or other defects, for that time period is determined in a similar manner. Specifically, concentrations are measured between 200 and 400 minutes after charging with helium to create a curve of concentrations versus time. This curve is integrated between 200 and 400 minutes and the resulting value is scaled to the FIG. 5 system using the exterior surface area of vessel 72, through which the permeation occurs, and the total volume where the helium concentration measurements are taken, namely the volume of space 72 plus the volumes of risers 74, 76 and hose 78.

These calculations produce two numbers. First, an average concentration that would be expected for the system over the test time based on permeation alone. And second, an average concentration that results from measured helium that would include permeation and any other helium flow that might be occurring.

Comparing the actual rate of change with the expected rate of change resulting from permeation determines whether there are leaks and/or whether a particular standard is met.

Figure 7:
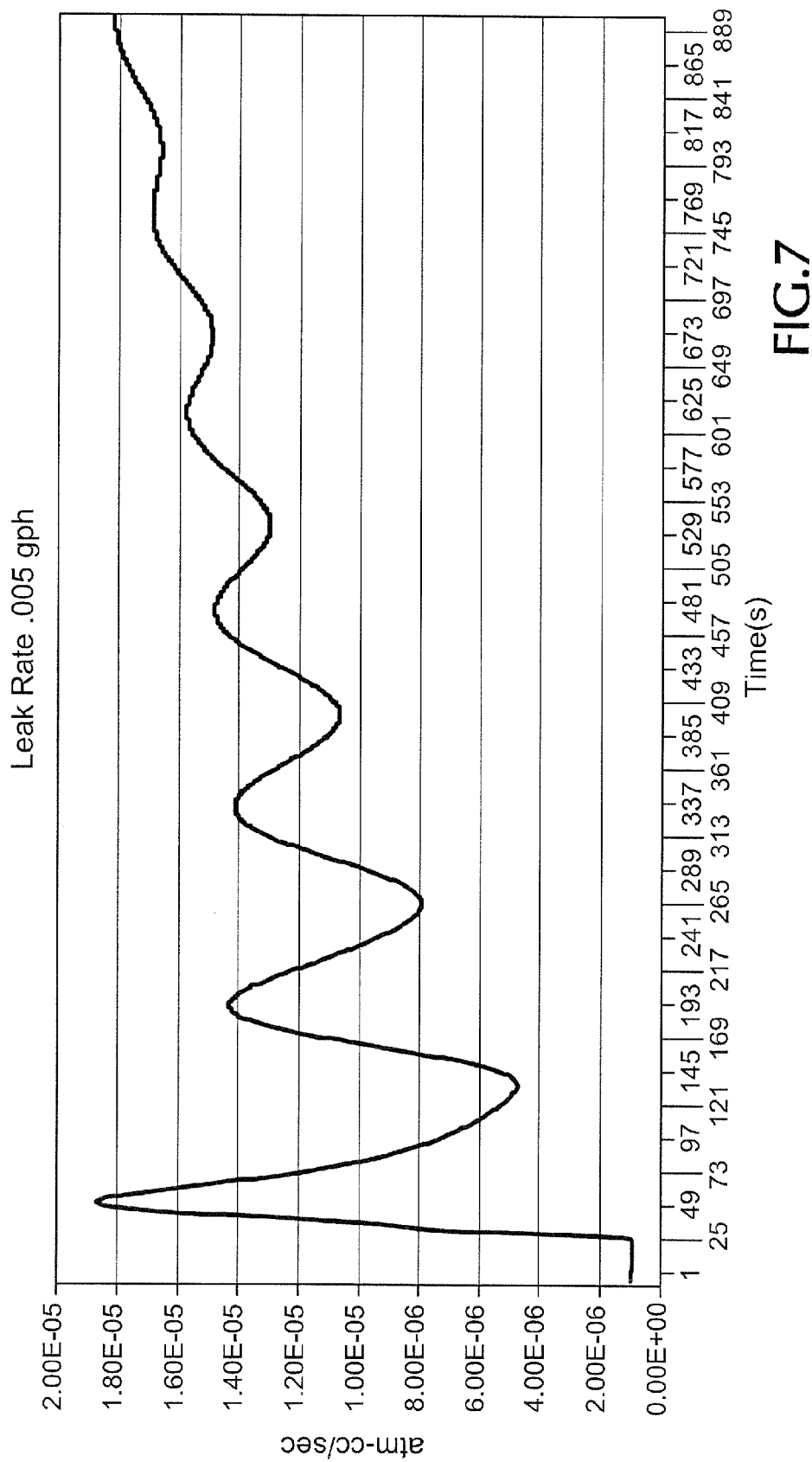
FIG. 7 is a test curve developed by the pipe testing setup in FIG. 3 indicating a leak in the pipe.

Turning now to FIG. 3, testing here proceeds in a similar manner. Pipe 48 is charged with helium from a tank (not shown) by gaining access to an end of the pipe, either via manway 50 or dispenser 54. The annulus between pipes 48, 64 is flushed by disconnecting one end of hose 56 and running pump 34. Detector 38 begins measuring helium concentrations, and fan 34 is started. If there is a leak into the annulus anywhere along pipe 48, detector 38 will measure a sharp increase in concentration once the initial slug of air propelled by the pump 34 pushes helium from the leak along the annulus, into hose 56 and to the detector. FIG. 7 depicts the peaks that occur as pump 34 circulates gas through hose 56 and the annulus. Because there is a leak, the concentration continues to increase over time. After repeated circulations, the peaks are dampened. It is possible to use this data, along with the volume of the annulus and hose 56 and the rate of air circulation by pump 34, to calculate an approximate leak location along pipe 48. This can be accomplished with this formula: flow rate x time between peaks/flow volume, where flow rate through the annulus is the pump rate for pump 34 and flow volume is the volume in which air is circulated, primarily the annulus between pipes 48, 64 and hose 56.

With a leak like that shown in FIG. 7 it would be immediately apparent that the system exceeded the 0.005 gallon per hour limit. But for a buried pipe that does not immediately exhibit a leak, the standard permeation curve for pipe 48, which is one of the standard permeation curves stored on computer 40, is integrated over the test time as are the measured concentrations, and compared with one another as described above to determine whether there is leaking beyond normal permeation and whether it exceeds the 0.005 gallon per hour limit.

Having described and illustrated the principles of the invention in a preferred embodiment thereof, it should be apparent that the invention can be modified in arrangement and detail without departing from such principles. I claim all modifications and variation coming within the spirit and scope of the following claims.

The invention claimed is:

1. A method for detecting a leak in a primary vessel that is made from a known material, the method comprising:
    measuring permeation of a predetermined gas through the known material;
    determining a standard permeation curve over time;
    pressurizing the primary vessel with the gas;
    measuring transmission of the gas through the primary vessel;
    determining a test transmission curve over time;
    selecting the same first time on each curve;
    selecting the same second time on each curve;
    calculating the change in gas concentration between the first and second times for each curve; and
    comparing the changed concentrations to determine whether the primary vessel is leaking.

2. The method of claim 1 wherein the standard permeation curve increases from zero, at a start time when the material is first exposed to the gas, to a substantially steady-state permeation value.

3. The method of claim 2 wherein the primary-vessel permeation increases from zero at a start time when the primary vessel is first pressurized.

4. The method of claim 3 wherein the time period on the standard permeation curve includes at least a portion of the curve before the substantially steady-state permeation value.

5. The method of claim 1 wherein the primary vessel is contained within a secondary vessel and wherein the method further includes:
    detecting the concentration of gas at a first location in the secondary vessel; and
    starting air circulating in the secondary vessel at a second location.

6. The method of claim 5 wherein the method further includes: analyzing the detected concentration of the tracer gas to determine whether or not the detected concentration exhibits a relatively abrupt increase indicative of a leak in the primary vessel and if the detected concentration exhibits such an increase:
    calculating the time between starting air circulation in the secondary vessel and the relatively abrupt increase; and
    determining the approximate location of the leak based on the time.

7. The method of claim 1 wherein calculating the change in gas concentration between the first and second times for each curve comprises calculating the average mass flow rate between the first and second times on each curve.

* * * * *